(12) United States Patent
Chang et al.

(10) Patent No.: US 8,001,099 B2
(45) Date of Patent: Aug. 16, 2011

(54) MAINTAINING AND UTILIZING COPY HISTORIES

(75) Inventors: Belinda Y. Chang, Cary, NC (US); Vijay Dheap, Durham, NC (US); Christopher J. Hardee, Raleigh, NC (US); Heather C. Miller, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/120,845

(22) Filed: May 15, 2008

(65) Prior Publication Data
US 2009/0287634 A1 Nov. 19, 2009

(51) Int. Cl.
*G06F 17/30* (2006.01)
*G06F 17/24* (2006.01)
(52) U.S. Cl. ........................................ 707/705; 715/255
(58) Field of Classification Search .................. 707/705; 715/255
See application file for complete search history.

(56) References Cited

U.S. PATENT DOCUMENTS

| | | | |
|---|---|---|---|
| 5,581,760 A * | 12/1996 | Atkinson et al. | 717/108 |
| 5,964,834 A | 10/1999 | Crutcher | |
| 6,177,939 B1 | 1/2001 | Blish et al. | |
| 6,986,105 B2 | 1/2006 | Walker | |
| 2003/0216824 A1 * | 11/2003 | Chu et al. | 700/94 |
| 2008/0147651 A1 * | 6/2008 | Bhogal et al. | 707/6 |

OTHER PUBLICATIONS

Microsoft: View up to 24 items on the Clipboard in Office, date unknown.*
Microsoft, View up to 24 items on the Clipboard in Office (accessed Nov. 18, 2010).*
Program URL, "Clipboard Box", http://www.programurl.com/clipboard-box.htm, (accessed Feb. 22, 2008).
Program URL, "Clipboard Magic", http://www.programurl.com/clipboard-magic.htm, (accessed Feb, 22, 2008).
Program URL, "Multiple Clipboard Software", http://www.programurl.com/software/multiple-clipboard.htm, (accessed Feb. 22, 2008).

* cited by examiner

*Primary Examiner* — James Trujillo
*Assistant Examiner* — William Spieler
(74) *Attorney, Agent, or Firm* — DeLizio Gilliam, PLLC

(57) ABSTRACT

In some embodiments a method comprises detecting a request to copy and determining information related to the copied data from the document. The method can also comprise augmenting a copy history to include the data and the information related to the data, and storing this copy history. The method can also include detecting a request to access the copy history associated with the document, presenting the copy history including the data and the information related to the copied data, and copying the data from the copy history for further use. The method can also comprise blocking copying of data if the document's copy rules are violated.

20 Claims, 4 Drawing Sheets

MAINTAINING AND UTILIZING COPY HISTORIES

TECHNICAL FIELD

Embodiments of the inventive subject matter generally relate to the field of computer software, data processing systems, and networks and, more particularly, to creating and accessing clipboards with a persistent copy history.

BACKGROUND

Users often copy text from documents to a clipboard. However, after the documents are closed, many systems purge the clipboard. Typically, users later reopen the same documents in need of the same text (i.e., the text that was copied to the clipboard). As a result, users may again spend time searching for the text. The time spent finding the needed text may be large, depending on the document size, the user's knowledge of the document, the document's organization, etc.

SUMMARY

In some embodiments a method comprises detecting a request to copy and determining information related to the copied data from the document. The method can also comprise augmenting a copy history to include the data and the information related to the data, and storing this copy history. The method can also include detecting a request to access the copy history associated with the document, presenting the copy history including the data and the information related to the copied data, and copying the data from the copy history for further use. The method can also comprise blocking copying of data if the document's copy rules are violated.

BRIEF DESCRIPTION OF THE DRAWINGS

The present embodiments may be better understood, and numerous objects, features, and advantages may be apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, the described embodiments may be practiced without these specific details. In some instances, well-known instruction instances, protocols, structures and techniques have not been shown in detail in order not to obfuscate the description.

Introduction

Users commonly copy and paste data within a document or into other applications. For some documents, many different users frequently copy the same data. For example, many users may frequently access a computer configuration document from which they copy login information into a separate computer login application. Before copying the login information into the login application, each user must locate the login information in the document. Finding the information can be a time consuming task, depending on the size of the document, the users' knowledge of the document, available search features, etc. As a result, users may want a system which allows them to search for data within a document based on the document's copy history. Some embodiments of the inventive subject matter enable users to quickly access a documents' earlier-copied data by providing a dynamic but persistent copy history for documents. Some embodiments use metadata to facilitate filtering and data access. The discussion below describes these and other important features in greater detail.

Example Architectures and Operating Environments

Standalone System

Figure 1:
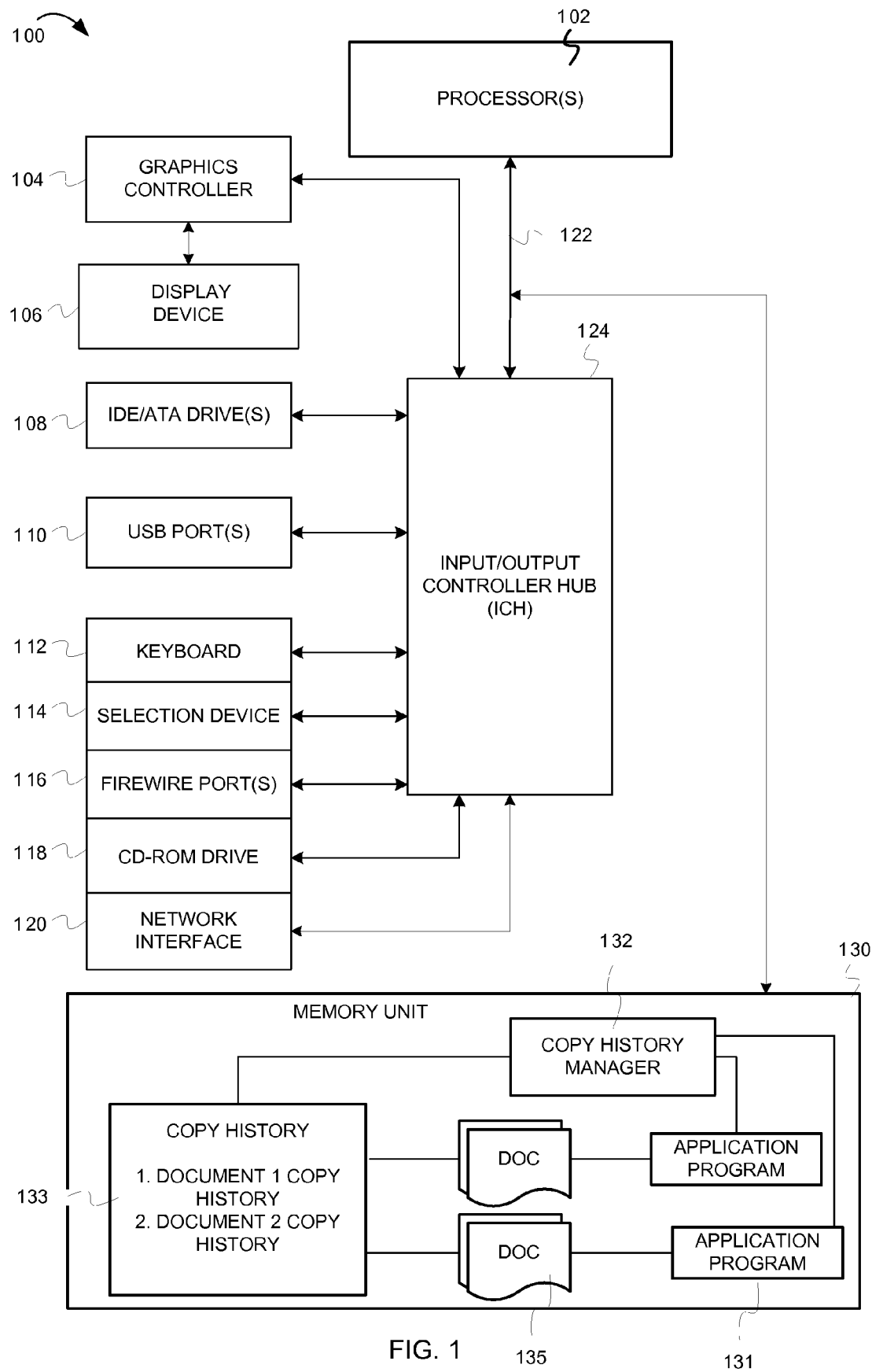
FIG. 1 is a block diagram illustrating a standalone computer system configured to utilize a persistent copy history for documents, according to some embodiments of the invention.

FIG. 1 is a block diagram illustrating a standalone computer system configured to utilize a persistent copy history for documents, according to some embodiments of the invention. The computer system 100 includes a processor 102. The processor 102 is connected to an input/output controller hub 124 (ICH), also known as a south bridge. A memory unit 130 interfaces with the processor 102 and the ICH 124. The main memory unit 130 can include any suitable random access memory (RAM), such as static RAM, dynamic RAM, synchronous dynamic RAM, extended data output RAM, etc.

In one embodiment, the memory unit 130 includes application programs 131, documents 135, a copy history manager 132, and a copy history 133. The application programs 131 can include word processors, text editors, web browsers, or any program that facilitates copying data from a document or other file. The copy history manager 132 can maintain a persistent copy history for the documents 135. That is, if an application program 131 allows a user to copy a document's content, the copy history manager 132 can record the copied content and information about the copied content (e.g., information about the user who copied the content, etc.) in the copy history 133. As other users access the document, the copy history manager 132 can present the copy history information. Therefore, users can quickly access content in the copy history without having to locate the content in the body of the document.

In some embodiments, the document's copy history 133 can be stored as part of the document 135 as metadata (not shown). In some embodiments, the copy history manager 132, copy history 133, and application programs 131 can reside on other forms of machine-readable medium such as flash RAM devices, CD-ROM, magneto-optical storage medium, erasable programmable memory (e.g., EPROM and EEPROM), or other types of media suitable for storing electronic instructions and data.

The ICH 124 connects and controls peripheral devices. In FIG. 1, the ICH 124 is connected to IDE/ATA drives 108 (used to connect external storage devices) and to universal serial bus (USB) ports 110. The ICH 124 may also be connected to a keyboard 112, a selection device 114, firewire ports 116 (for use with video equipment), CD-ROM drive 118, and a network interface 120. The ICH 124 can also be connected to a graphics controller 104. The graphics controller is connected to a display device (e.g., monitor).

In some embodiments, the computer system 100 can include additional devices and/or more than one of each component shown in FIG. 1 (e.g., video cards, audio cards, peripheral devices, etc.). For example, in some instances, the computer system 100 may include multiple processors, multiple cores, multiple external CPU's. In other instances, components may be integrated or subdivided. In addition, embodiments may be embodied in an electrical, optical, acoustical or other form of propagated signal (e.g., carrier waves, infrared signals, digital signals, etc.), or wireline, wireless, or other communications medium.

Client-Server System

Figure 2:
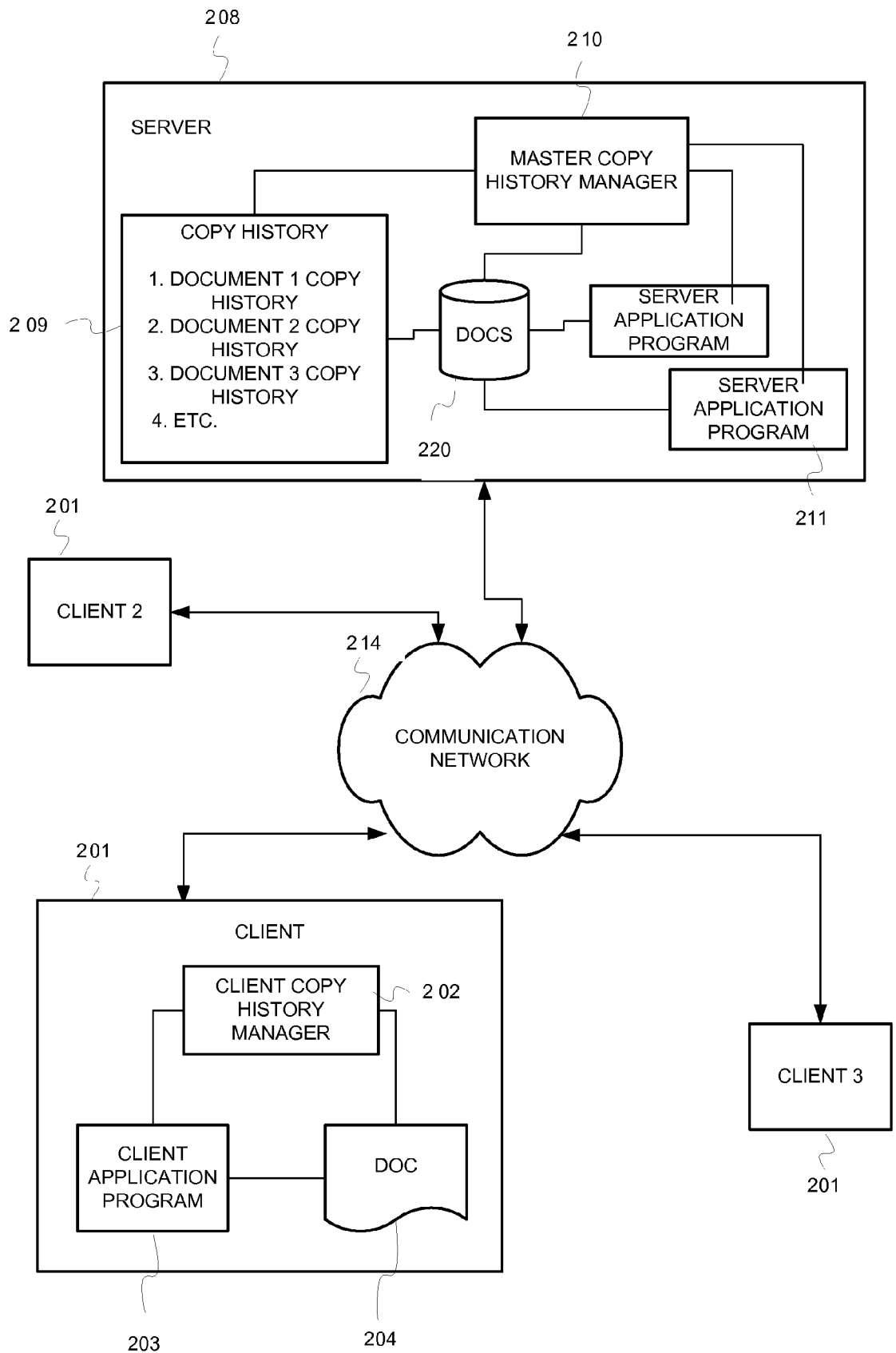
FIG. 2 is a block diagram illustrating a client-server system configured to maintain and present document copy histories, according to some embodiments of the invention.

FIG. 2 is a block diagram illustrating a client-server system configured to maintain and present document copy histories, according to some embodiments of the invention. As shown in FIG. 2, the system 200 includes a server 208 and clients 201. The server 208 includes server application programs 211, a document repository 220, a master copy history manager 210, and a master copy history 209. The server application programs 211 can include word processors, text editors, software developments tools, and any other program that facilitates copying data from a document or other file. The clients 201 include an application program client 203, client copy manager 202, and document(s) 204. In some embodiments, the document's copy history 209 can also be stored as part of the document 220 as metadata (not shown).

In some embodiments, the server 208 enables the clients 201 to remotely execute application programs and access copy histories. In some instances, the server application programs 211 (e.g., word processors, text editors, etc.) send data and code for remote execution on the clients 201. For example, a server application program 211 can send a text document and Java script to a client's application program client 203. Additionally, the master copy history manager 210 can send copy history information and Java script for remotely presenting and maintaining a copy history for the text document. In turn, the application program client 203 can execute the Java scripts, enabling a user to edit and copy the document's content, and to view and utilize the copy history associated with the text document.

The server 208 and clients 201 can be any suitable computing devices capable of executing software in accordance with the embodiments described herein. In some embodiments, the application program client 203 and client copy manager 202 are included in a web browser.

The server 208 and the clients 201 are connected through a communication network 214. The communication network 214 can include any technology suitable for passing communication between the clients and servers (e.g., Ethernet, 802.11n, SONET, etc.). Moreover, the communication network 214 can be part of other networks, such as cellular telephone networks, public-switched telephone networks, cable television networks, etc.

Example Copy Manager Operations

This section describes operations associated with some embodiments of the invention. The flow diagrams will be described with reference to the architectural block diagrams presented above. Some embodiments can perform more or less than the operations shown in any flow diagram.

Figure 3:
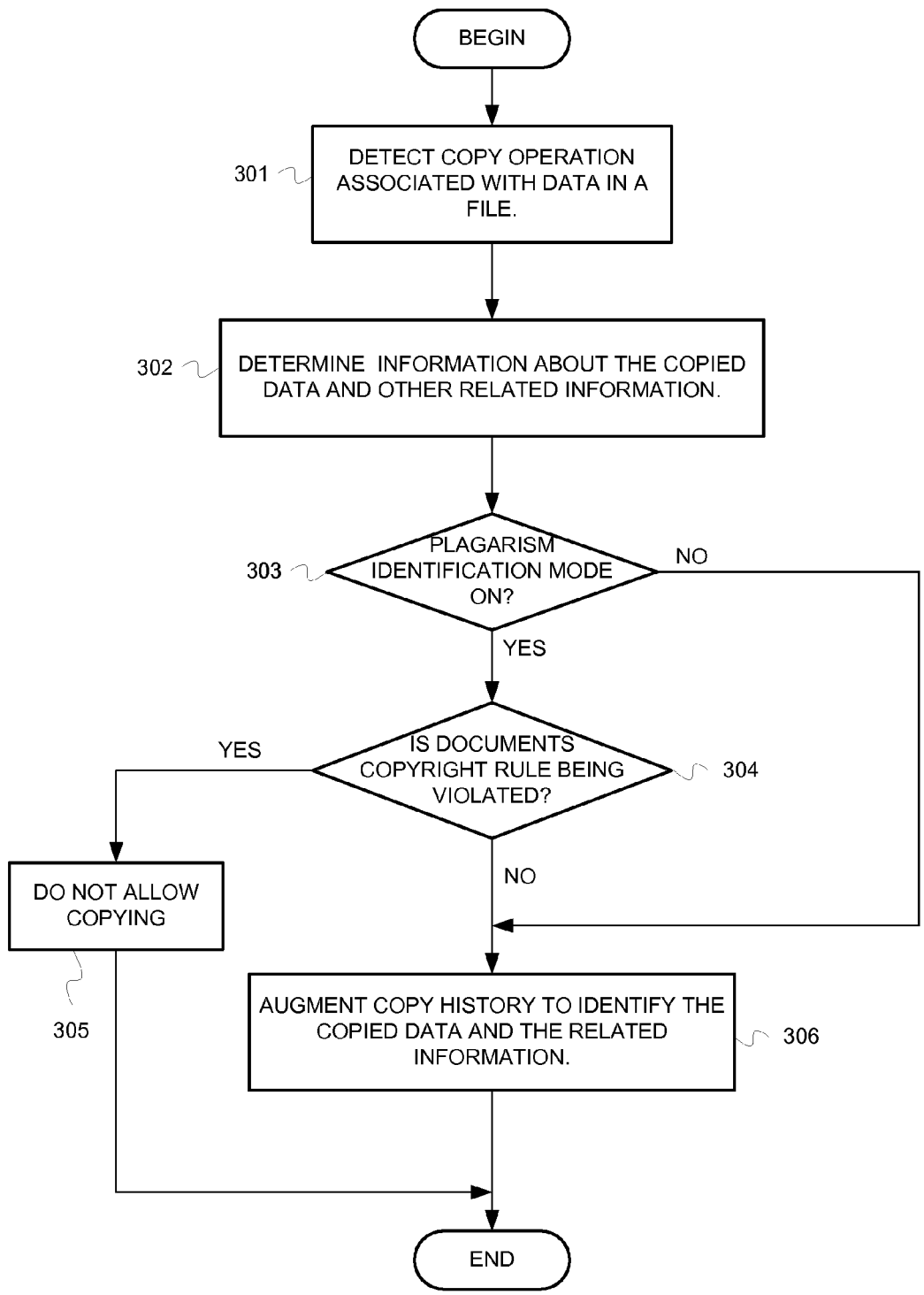
FIG. 3 is a flow diagram illustrating the operations for creating and storing a persistent copy history, according to some embodiments of the invention

FIG. 3 is a flow diagram illustrating the operations for creating and storing a persistent copy history, according to some embodiments of the invention. The following discussion will describe the flow 300 with reference to the client-server system of FIG. 2. The flow diagram 300 begins at block 301.

At block 301, the client copy history manager 202 detects a copy operation associated with data in a document 204. In some instances, a user provides input instructing the client application program 203 to copy a portion of the document 204 (or the whole document). The client copy manager 202 can detect the copy operation by receiving communications from the client application program 203, by monitoring copy operations by an operations system (not shown), or by other means. The flow continues at block 302.

At block 302, the client copy history manager 202 determines information about the copied data and other related information. For example, the copy manager 202 can determine what data the user wants to copy, line numbers of the copy data, etc. The related information may include information about the source and target (e.g., source file name, destination file name, source file location, destination file location, etc), user name, user login information, date and time of copying, etc. The flow continues at block 303.

At block 303, the client copy history manager 202 determines whether copy rules are enabled. In some embodiments, a "copy rules" flag may be associated with the document (e.g., stored in the document itself or separately). The copy rules flag can indicate that certain copy operations are forbidden (e.g., large block copy operations) to prevent plagiarism, copyright violations, or other unwanted copying. If the copy rules are enabled, the flow continues at block 304. Otherwise, the flow continues at block 306.

At block 304, the client copy history manager 202 determines whether the copy request violates the document's copy rules. In some embodiments, the client copy manager 202 itself makes this determination. Some copy rules may prohibit particular users from copying certain documents, while other copy rules may forbid copying from certain files, etc. These copy rules may be associated with the document, user, application, etc. If the copy request violates copy rules, the flow continues at block 305. Otherwise, the flow continues at block 306.

At block 305, the client copy history manager 202 prevents execution of the copy request. The client copy history manager 202 can prevent the copy request by sending a message to the client application program 203, by sending a message to the operating system (not shown), or by other means. From block 305, the flow ends without any updates to the copy history 209.

At block 306, the client copy history manager 202 augments the master copy history 209 to identify the copied data and to include any related information. As shown, the copy history 209 includes copy information for each document in the document repository 220 (see FIG. 2). Thus, when users access a document, they have access to the document's copy history. In some embodiments, the copy information can be associated with a user, source file, destination file, machine, operating system, software, browser, a server, etc. As a result, some embodiments allow users to request copy information based on any of these associations. The server 208 can provide access to the copy history 209 via the communication network 214. From block 306, the flow ends.

The sequence of operations described in FIG. 3 can also be performed by the embodiment described in FIG. 1, where the copy history manager 132 and copy history 133 reside on the same machine.

Figure 4:
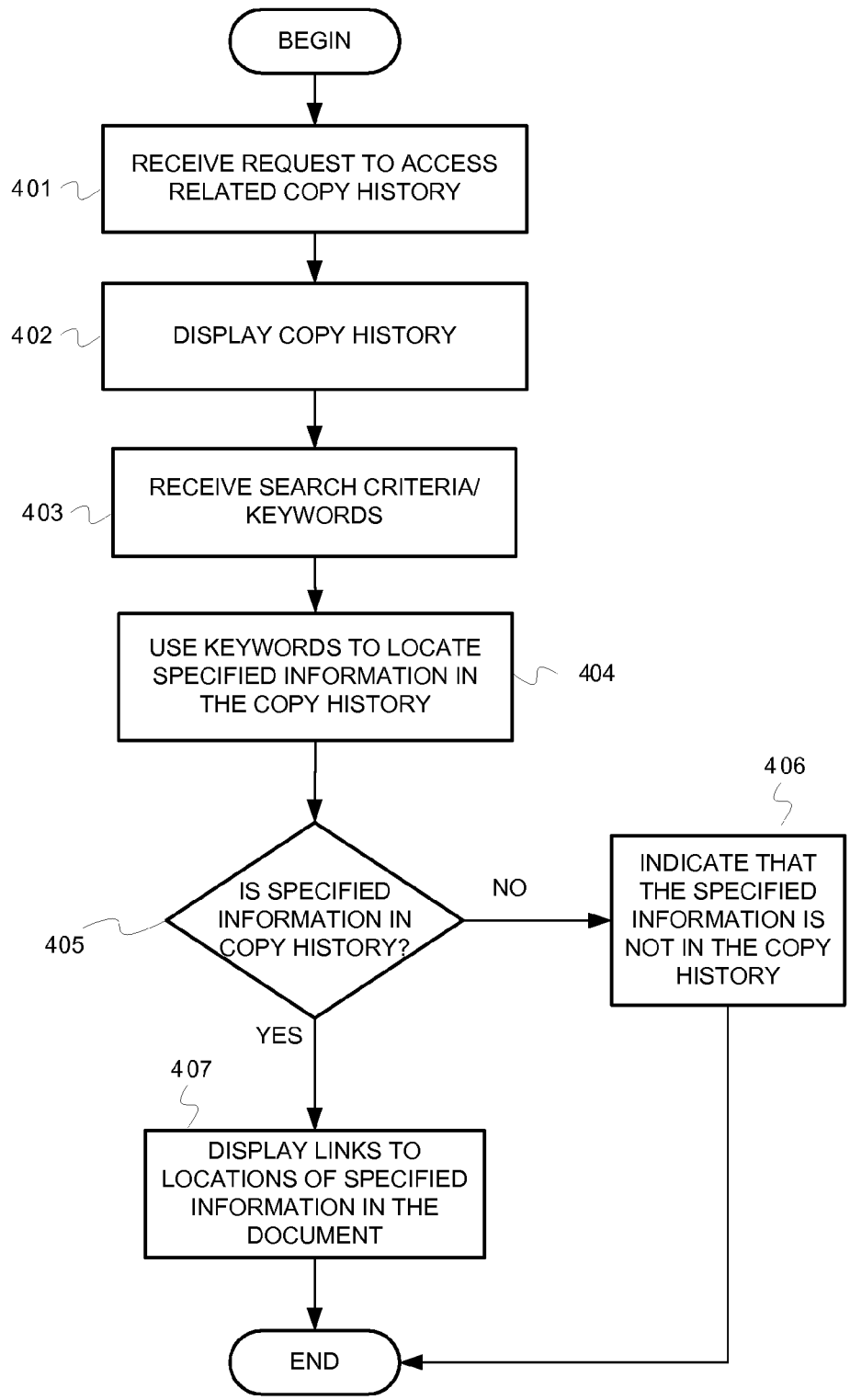
FIG. 4 is a flow diagram illustrating the operations for accessing and presenting a copy history, according to some embodiments of the invention.

FIG. 4 is a flow diagram illustrating the operations for accessing and presenting a copy history, according to some embodiments of the invention. As noted above, the copy history manager 202 can act as an interface between the master copy history 209 and the client application program 203. The copy history manager 202 can access and display the document's copy history when it receives a request from the user. The following discussion will describe the flow 400 with reference to the client-server system of FIG. 2. The flow diagram 400 begins at block 401.

At block 401, the client copy history manager 202 detects a request to access copy history 209. In some instances, when the client application program 203 opens a document, the copy history manager 202 presents graphical user interface (GUI) controls (e.g., icon, tool bar, etc.) that allow users to access the document's copy history information. If a user activates the GUI controls, the copy history manager 202 can present the document's copy history information in a window or other GUI component. The client copy history manager 202 may acquire the document's copy history information from the master copy history manager 210 when the document is opened or later when a user requests it using the GUI controls. In some embodiments, the copy history information arrives as an XML file. The flow continues at block 402.

At block 402, the client copy history manager 202 displays the document's copy history information. In some embodiments, the copy history manager 202 displays the document's copy history in the GUI window. In some embodiments, the most frequently copied content (e.g., characters, words, phrases) appears most prevalently in the window (e.g., at the top). However, the copy history manager 202 can decide prevalence based on user attributes, user preferences such as username, user's role in the organization, etc. In addition to the copied content, the copy history information can include source file name, destination file name, source file location, destination file location, date and time of copying, etc. The flow continues at block 403.

At block 403, the client copy history manager 202 receives search criteria or keywords related to the previously copied data. The manager's GUI window may include textboxes in which the user types keywords related to the data to be found. The GUI window may also include checkboxes or drop down menus allowing the user to select from a list of pre-defined search criteria (e.g., file location, time of copying, etc). When the user clicks on a "search" button initiating the search, the client copy history manager 202 receives these keywords and criteria. The client copy history manager 202 uses these keywords to locate and display the related information. The flow continues at block 404.

At block 404, the copy history manager 202 uses the keywords to locate the specified information in the master copy history 209. In some embodiments, the client copy history manager 202 can send the keywords to the master copy history manager 210. In turn, the master copy history manager 210 can use any suitable search procedure or an algorithm to search the copy history 209. In some embodiments, the search procedure looks for the actual search terms in the copy history 209. However, the search procedure may also look for other related terms. In some embodiments, the master copy history manager 210 can filter the copy history based on criteria, such as who has copied the data, how many times it has been copied or pasted, when the document was last accessed, which applications used the document, etc. In some embodiments, the manager 210 can also use the metadata to identify the user's usage patterns and filter the copy history 209 based on the user or the group of users that have used the document. That is, the manager 210 may draw on the user's or a group's copy/paste history to locate specific information in the copy history and display the relevant search results to the user. The flow continues at block 405.

At block 405, the copy history manager 202 determines whether the relevant information was found in the master copy history 209. If the relevant information is in the document's copy history, the server 208 may send a message to the client 201 containing the specified information. The message may also have a "data unavailable" flag in its header. This flag can notify the client copy history manager 202 when information related to the user specified search criteria was not found. If the specified information is not found in the copy history, flow continues at block 406. Otherwise, the flow continues at block 407.

At block 406, the client copy history manager 202 indicates that the specified information does not exist in the copy history. The client copy history manager 202 can notify the user by displaying a message in its GUI window or by other means. Alternatively, it can send a message to the client application program 203, which notifies the user. From block 406, the flow ends without displaying any information.

At block 407, the client copy history manager 202 displays links to the specified information in the document. For example, the client copy history manager 202 can retrieve the information from the message sent by the server (see above) and present this information in its GUI window. The user can click the links to jump to locations in the document containing the specified information. From block 408, the flow ends.

The discussion of FIG. 4 describes the master copy history manager 210 performing search operations and other functions. However, in some embodiments, the master copy history manager 210 only delivers a document's copy history to the client 201. In turn, the client's components can perform searching and other operations. Furthermore, the sequence of operations described in FIG. 4 can also be performed by the embodiment described in FIG. 1 where the copy manager 132 and copy history 133 reside on the same machine.

CONCLUSION

While the embodiments are described with reference to various implementations and exploitations, these embodiments are illustrative and the scope of the inventive subject matter is not limited to them. In general, techniques for creating, storing and using a persistent copy history are described herein and may be implemented with facilities consistent with any hardware system or hardware systems. Many variations, modifications, additions, and improvements are possible.

In some instances, structure and functionality presented as separate components in example configurations may be implemented with combined structures or components. Similarly, structures and functionality presented as a single component may be implemented as separate components. These and other variations, modifications, additions, and improvements may fall within the scope of the inventive subject matter. Finally, boundaries between various components, operations and data stores are somewhat arbitrary, and particular operations are illustrated in the context of specific illustrative configurations. Other allocations of functionality are envisioned and may fall within the scope of the inventive subject matter.

What is claimed is:

1. A method for utilizing a copy history associated with a document, the method comprising:
   detecting, during a first presentation of the document, a first request to copy data from the document;
   copying, during the first presentation of the document, the data;

determining information related to the data from the document;

augmenting a copy history to include the data and the information related to the data;

detecting, during a second presentation of the document, a second request to access the copy history associated with the document;

presenting the copy history including the data and the information related to the copied data, wherein the data is available for copying without searching in the document; and copying, during the second presentation of the document, the data from the copy history for use outside of the document.

2. The method of claim 1, further including:

blocking the request to copy the data from the document based on copy rules associated with the document.

3. The method of claim 1, wherein the information related to the copied data includes any one or more of user name, user login information, and file metadata.

4. The method of claim 1, wherein the information related to the data includes any one or more of a name of the document, a location of the document, a date and time of copy request.

5. The method of claim 1, wherein the information related to the data indicates any one or more of users that have copied the data, a number of times the data has been copied, applications to which the data has been copied.

6. The method of claim 1, wherein presenting the copy history includes presenting one or more of the hyperlinks to locations at which the data appears in the document.

7. The method of claim 1, wherein the first presentation of the document is associated with a first user, and wherein the second presentation of the document is associated with a second user.

8. An apparatus for utilizing a copy history associated with one or more documents, the apparatus comprising:

the one or more documents, wherein the one or more documents include data;

one or more applications configured to operate on the documents and the data;

a copy manager configured to detect, during a first presentation of the document, a request to copy data from the document, to determine information related to the data from the document, to augment a copy history to include the data and the information related to the data, to detect, during a second presentation of the document, a request to access the copy history associated with the document, to present the copy history including the data and the information related to the copied data, wherein the data is available for copying without searching in the document, and to copy, during the second presentation of the document, the data from the copy history for use outside of the document; and a processor configured to execute the one or more applications and the copy manager.

9. The apparatus of claim 8, further including:

the copy manager configured to block the request to copy the data from the document based on copy rules associated with the document.

10. The apparatus of claim 8, wherein the information related to the copied data includes any one or more of user name, user login information, and file metadata.

11. The apparatus of claim 8, wherein the information related to the data includes any one or more of a name of the document, a location of the document, a date and time of copy request.

12. The apparatus of claim 8, wherein the information related to the data indicates any one or more of users that have copied the data, a number of times the data has been copied, applications to which the data has been copied.

13. The apparatus of claim 8, wherein the copy manager is configured to present the copy history which includes presenting one or more of the hyperlinks to locations at which the data appears in the document.

14. The apparatus of claim 8, wherein the first presentation of the document is associated with a first user, and wherein the second presentation of the document is associated with a second user.

15. One or more machine-readable media having stored therein a program product, which when executed a set of one or more processor units causes the set of one or more processor units to perform operations for utilizing a copy history associated with a document, the operations comprising:

detecting, during a first presentation of the document, a request to copy data from the document;

determining information related to the data from the document;

augmenting a copy history to include the data and the information related to the data;

detecting, during a second presentation of the document, a request to access the copy history associated with the document;

presenting the copy history including the data and the information related to the copied data, wherein the data is available for copying without searching in the document; and copying, during the second presentation of the document, the data from the copy history for use outside of the document.

16. The one or more machine-readable media of claim 15, further including:

blocking the request to copy the data from the document base on copy rules associated with the document.

17. The one or more machine-readable media of claim 15, wherein the information related to the copied data includes any one or more of user name, user login information, and file metadata.

18. The one or more machine-readable media of claim 15, wherein the information related to the data includes any one or more of a name of the document, a location of the document, a date and time of copy request, and indicates any one or more of users that have copied the data, a number of times the data has been copied, and applications to which the data has been copied.

19. The one or more machine-readable media of claim 15, wherein presenting the copy history includes presenting one or more of the hyperlinks to locations at which the data appears in the document.

20. The one or more machine-readable media of claim 15, wherein the first presentation of the document is associated with a first user, and wherein the second presentation of the document is associated with a second user.

* * * * *